(12) United States Patent
Beda, III et al.

(10) Patent No.: US 8,874,888 B1
(45) Date of Patent: Oct. 28, 2014

(54) MANAGED BOOT IN A CLOUD SYSTEM

(75) Inventors: Joseph S. Beda, III, Seattle, WA (US); Sanjeet Singh Mehat, Seattle, WA (US); Robert H. Earhart, III, Seattle, WA (US); Andrew Thornton, Seattle, WA (US); David T. McWherter, Seattle, WA (US); Evan K. Anderson, Seattle, WA (US); Frank Berreth, Irvine, CA (US)

(73) Assignee: Google Inc., Monutain View, CA (US)

( * ) Notice: Subject to any disclaimer, the term of this patent is extended or adjusted under 35 U.S.C. 154(b) by 332 days.

(21) Appl. No.: 13/344,450

(22) Filed: Jan. 5, 2012

Related U.S. Application Data (60) Provisional application No. 61/432,553, filed on Jan. 13, 2011.

(51) Int. Cl.
*G06F 15/177* (2006.01)
*G06F 9/24* (2006.01)
*G06F 9/00* (2006.01)
*G06F 9/455* (2006.01)
*G06F 9/44* (2006.01)
*G06F 9/445* (2006.01)

(52) U.S. Cl.
CPC .......... *G06F 9/4406* (2013.01); *G06F 9/45533* (2013.01); *G06F 9/455* (2013.01); *G06F 9/44505* (2013.01); *G06F 9/4416* (2013.01); *G06F 9/4401* (2013.01)
USPC ................... 713/2; 713/1; 713/100; 709/222; 718/1

(58) Field of Classification Search
CPC ... G06F 9/45533; G06F 9/455; G06F 9/4401; G06F 9/4406; G06F 9/44505; G06F 9/4416
USPC .......... 713/1, 2, 100; 709/222; 718/1
See application file for complete search history.

(56) References Cited

U.S. PATENT DOCUMENTS

| | | | |
|---|---|---|---|
| 5,463,768 | A | 10/1995 | Cuddihy et al. |
| 5,655,081 | A | 8/1997 | Bonnell et al. |
| 5,778,444 | A | 7/1998 | Langan et al. |
| 5,794,224 | A | 8/1998 | Yufik |
| 6,148,368 | A | 11/2000 | DeKoning |
| 6,178,482 | B1 | 1/2001 | Sollars |
| 6,449,671 | B1 | 9/2002 | Patkar et al. |

(Continued)

FOREIGN PATENT DOCUMENTS

WO    WO 2011/095516    8/2011

OTHER PUBLICATIONS

Moller, Jan, et al., "Internal Network Security", Feb. 1, 2000-May 18, 2001, Retrieved from the Internet: <URL: http://www.daimi.au.dk/~fwiffo/thesis/>, 183 pages.

(Continued)

*Primary Examiner* — Ji H Bae
(74) *Attorney, Agent, or Firm* — Fish & Richardson P.C.

(57) ABSTRACT

Techniques and systems for managed boot are described. A described technique includes creating, at a server system, a boot image based on one or more user-specified parameters associated with virtual machine booting, providing a first virtual drive that includes the boot image, booting a virtual machine using the boot image on the first virtual drive, and providing a second virtual drive to the virtual machine, where the virtual machine mounts the second virtual drive as a root file system.

26 Claims, 6 Drawing Sheets

(56) References Cited

U.S. PATENT DOCUMENTS

| | | | |
|---|---|---|---|
| 6,490,651 B1 | 12/2002 | Shats | |
| 6,505,211 B1 | 1/2003 | Dessloch et al. | |
| 6,505,248 B1 | 1/2003 | Casper et al. | |
| 6,587,866 B1 | 7/2003 | Modi et al. | |
| 6,598,179 B1 | 7/2003 | Chirashnya et al. | |
| 6,643,613 B2 | 11/2003 | McGee et al. | |
| 6,829,678 B1 | 12/2004 | Sawdon et al. | |
| 6,891,839 B2 | 5/2005 | Albert et al. | |
| 6,898,697 B1 | 5/2005 | Gao et al. | |
| 6,996,502 B2 | 2/2006 | De La Cruz et al. | |
| 7,043,455 B1 | 5/2006 | Cuomo et al. | |
| 7,062,718 B2 | 6/2006 | Kodosky et al. | |
| 7,117,243 B2 | 10/2006 | Peart | |
| 7,356,679 B1 * | 4/2008 | Le et al. | 713/1 |
| 7,466,703 B1 | 12/2008 | Arunachalam et al. | |
| 7,478,388 B1 | 1/2009 | Chen et al. | |
| 7,500,262 B1 | 3/2009 | Sanin et al. | |
| 7,529,836 B1 | 5/2009 | Bolen et al. | |
| 7,584,467 B2 | 9/2009 | Wickham et al. | |
| 7,596,620 B1 | 9/2009 | Colton et al. | |
| 7,650,331 B1 | 1/2010 | Dean et al. | |
| 7,653,833 B1 | 1/2010 | Miller et al. | |
| 7,761,573 B2 | 7/2010 | Travostino et al. | |
| 7,804,862 B1 | 9/2010 | Olson et al. | |
| 7,836,285 B2 | 11/2010 | Giri et al. | |
| 8,051,414 B2 | 11/2011 | Stender et al. | |
| 8,065,717 B2 | 11/2011 | Band | |
| 8,103,771 B2 | 1/2012 | Tanaka et al. | |
| 8,108,903 B2 | 1/2012 | Norefors et al. | |
| 8,127,295 B1 | 2/2012 | Jones et al. | |
| 8,146,147 B2 | 3/2012 | Litvin et al. | |
| 8,219,777 B2 | 7/2012 | Jacobson et al. | |
| 8,261,295 B1 | 9/2012 | Risbood et al. | |
| 8,276,140 B1 | 9/2012 | Beda et al. | |
| 8,296,459 B1 | 10/2012 | Brandwine et al. | |
| 8,407,687 B2 | 3/2013 | Moshir et al. | |
| 8,423,993 B2 | 4/2013 | Faus et al. | |
| 8,468,535 B1 * | 6/2013 | Keagy et al. | 718/104 |
| 8,484,353 B1 | 7/2013 | Johnson et al. | |
| 8,504,844 B2 | 8/2013 | Browning | |
| 8,533,796 B1 | 9/2013 | Shenoy et al. | |
| 2002/0091902 A1 | 7/2002 | Hirofuji | |
| 2002/0097747 A1 | 7/2002 | Kirkby | |
| 2004/0068637 A1 | 4/2004 | Nelson et al. | |
| 2004/0139368 A1 | 7/2004 | Austen et al. | |
| 2004/0148484 A1 | 7/2004 | Watanabe et al. | |
| 2004/0210653 A1 | 10/2004 | Kanoor et al. | |
| 2005/0010715 A1 | 1/2005 | Davies et al. | |
| 2005/0166011 A1 | 7/2005 | Burnett et al. | |
| 2005/0196030 A1 | 9/2005 | Schofield et al. | |
| 2005/0216659 A1 | 9/2005 | Ogawa et al. | |
| 2005/0237543 A1 | 10/2005 | Kikuchi | |
| 2005/0289499 A1 | 12/2005 | Ogawa et al. | |
| 2006/0026354 A1 | 2/2006 | Lesot et al. | |
| 2006/0048077 A1 | 3/2006 | Boyles | |
| 2006/0048130 A1 | 3/2006 | Napier et al. | |
| 2006/0059228 A1 | 3/2006 | Kasamsetty et al. | |
| 2006/0067236 A1 | 3/2006 | Gupta | |
| 2006/0075199 A1 | 4/2006 | Kallahalla et al. | |
| 2006/0098618 A1 | 5/2006 | Bouffioux | |
| 2006/0153099 A1 | 7/2006 | Feldman | |
| 2006/0161753 A1 | 7/2006 | Aschoff et al. | |
| 2006/0235795 A1 | 10/2006 | Johnson et al. | |
| 2006/0271547 A1 | 11/2006 | Chen et al. | |
| 2007/0005761 A1 | 1/2007 | Wolters | |
| 2007/0011361 A1 | 1/2007 | Okada et al. | |
| 2007/0112956 A1 | 5/2007 | Chapman et al. | |
| 2007/0118694 A1 | 5/2007 | Watanabe et al. | |
| 2007/0123276 A1 | 5/2007 | Parker et al. | |
| 2007/0177198 A1 | 8/2007 | Miyata | |
| 2007/0199058 A1 | 8/2007 | Baumgart et al. | |
| 2007/0271604 A1 | 11/2007 | Webster et al. | |
| 2007/0280243 A1 | 12/2007 | Wray et al. | |
| 2007/0288921 A1 | 12/2007 | King et al. | |
| 2008/0028389 A1 | 1/2008 | Genty et al. | |
| 2008/0086515 A1 | 4/2008 | Bai et al. | |
| 2008/0095176 A1 | 4/2008 | Ong et al. | |
| 2008/0107112 A1 | 5/2008 | Kuo et al. | |
| 2008/0205415 A1 | 8/2008 | Morales | |
| 2008/0208681 A1 | 8/2008 | Hammad et al. | |
| 2008/0215796 A1 | 9/2008 | Lam et al. | |
| 2008/0222246 A1 | 9/2008 | Ebling et al. | |
| 2008/0222375 A1 | 9/2008 | Kotsovinos et al. | |
| 2008/0244030 A1 | 10/2008 | Leitheiser | |
| 2008/0244471 A1 | 10/2008 | Killian et al. | |
| 2008/0250407 A1 | 10/2008 | Dadhia et al. | |
| 2008/0270704 A1 | 10/2008 | He et al. | |
| 2008/0304516 A1 | 12/2008 | Feng et al. | |
| 2008/0307258 A1 | 12/2008 | Challenger et al. | |
| 2008/0310324 A1 | 12/2008 | Chaponniere | |
| 2009/0025074 A1 | 1/2009 | Le Saint et al. | |
| 2009/0097657 A1 | 4/2009 | Scheidt et al. | |
| 2009/0150629 A1 | 6/2009 | Noguchi et al. | |
| 2009/0199177 A1 | 8/2009 | Edwards et al. | |
| 2009/0222815 A1 | 9/2009 | Dake | |
| 2009/0235358 A1 | 9/2009 | Tolba | |
| 2009/0240744 A1 | 9/2009 | Thomson et al. | |
| 2009/0241108 A1 | 9/2009 | Edwards et al. | |
| 2009/0249440 A1 | 10/2009 | Platt et al. | |
| 2009/0276771 A1 | 11/2009 | Nickolov et al. | |
| 2009/0282266 A1 | 11/2009 | Fries et al. | |
| 2009/0300605 A1 | 12/2009 | Edwards et al. | |
| 2009/0300641 A1 * | 12/2009 | Friedman et al. | 718/104 |
| 2009/0310554 A1 | 12/2009 | Sun et al. | |
| 2010/0017859 A1 | 1/2010 | Kelly | |
| 2010/0023582 A1 | 1/2010 | Pedersen et al. | |
| 2010/0046426 A1 | 2/2010 | Shenoy et al. | |
| 2010/0057913 A1 | 3/2010 | DeHaan | |
| 2010/0071035 A1 | 3/2010 | Budko et al. | |
| 2010/0088335 A1 | 4/2010 | Mimatsu | |
| 2010/0199089 A1 | 8/2010 | Vysogorets et al. | |
| 2010/0212004 A1 | 8/2010 | Fu | |
| 2010/0215050 A1 | 8/2010 | Kanada | |
| 2010/0274984 A1 | 10/2010 | Inomata et al. | |
| 2010/0287548 A1 | 11/2010 | Zhou et al. | |
| 2010/0293285 A1 | 11/2010 | Oishi et al. | |
| 2010/0303241 A1 | 12/2010 | Breyel | |
| 2011/0010483 A1 | 1/2011 | Liljeberg | |
| 2011/0022812 A1 | 1/2011 | van der Linden et al. | |
| 2011/0055361 A1 | 3/2011 | DeHaan | |
| 2011/0060882 A1 | 3/2011 | Efstathopoulos | |
| 2011/0085563 A1 | 4/2011 | Kotha et al. | |
| 2011/0103389 A1 | 5/2011 | Kidambi et al. | |
| 2011/0153697 A1 | 6/2011 | Nickolov et al. | |
| 2011/0153838 A1 | 6/2011 | Belkine et al. | |
| 2011/0179412 A1 | 7/2011 | Nakae et al. | |
| 2011/0191485 A1 | 8/2011 | Umbehocker | |
| 2011/0191768 A1 | 8/2011 | Smith | |
| 2011/0197024 A1 | 8/2011 | Thomas | |
| 2011/0231280 A1 | 9/2011 | Farah | |
| 2011/0246767 A1 | 10/2011 | Chaturvedi et al. | |
| 2011/0258441 A1 | 10/2011 | Ashok et al. | |
| 2011/0296157 A1 | 12/2011 | Konetski et al. | |
| 2011/0302400 A1 | 12/2011 | Maino et al. | |
| 2011/0302415 A1 | 12/2011 | Ahmad et al. | |
| 2012/0060018 A1 | 3/2012 | Shinde et al. | |
| 2012/0063458 A1 | 3/2012 | Klink et al. | |
| 2012/0084570 A1 | 4/2012 | Kuzin et al. | |
| 2012/0084768 A1 * | 4/2012 | Ashok et al. | 717/174 |
| 2012/0089981 A1 | 4/2012 | Tripathi | |
| 2012/0159634 A1 | 6/2012 | Haikney et al. | |
| 2012/0173866 A1 | 7/2012 | Ashok et al. | |
| 2012/0179796 A1 | 7/2012 | Nagaraj et al. | |
| 2012/0185688 A1 | 7/2012 | Thornton | |
| 2012/0191912 A1 | 7/2012 | Kadatch et al. | |
| 2012/0233678 A1 | 9/2012 | Pal | |
| 2012/0233705 A1 | 9/2012 | Boysen et al. | |
| 2012/0246637 A1 | 9/2012 | Kreeger et al. | |
| 2012/0266159 A1 | 10/2012 | Risbood et al. | |
| 2013/0074181 A1 | 3/2013 | Singh | |
| 2013/0081014 A1 | 3/2013 | Kadatch et al. | |
| 2013/0117801 A1 | 5/2013 | Shieh et al. | |
| 2013/0212709 A1 | 8/2013 | Tucker | |

(56) References Cited

U.S. PATENT DOCUMENTS

| | | | |
|---|---|---|---|
| 2013/0227303 A1 | 8/2013 | Kadatch et al. | |
| 2013/0262405 A1 | 10/2013 | Kadatch et al. | |
| 2013/0276068 A1* | 10/2013 | Alwar | 726/4 |

OTHER PUBLICATIONS

Primet, Pascale, et al.., "HIPCAL: State of the Art of OS and Network virtualization solutions for Grids", Sep. 14, 2007, 38 pages.
Wikipedia, "IPSec", [online] [retrieved on Jan. 1, 2011]. Retrieved from the Internet: <URL: http://en.wikipedia.org/wiki/IPsec/>, 8 pages.
Abdull, AlastairIrvine, et al. "Generic Routing Encapsulation", [online] [retrieved on Jan. 4, 2011]. Retrieved from the Internet: <URL: http://creativecommons. org/licenses/ by-sa/ 3. 0/>, 5 pages.
Farinacci et al., "RFC 2784: Generic Routing Encapsulation (GRE)", Mar. 2000, The Internet Society, 10 pages.
Kent et al., "RFC 4301: Security Architecture for the Internet Protocol", Dec. 2005, The Internet Society, 102 pages.
Wikipedia, "Domain Name System". [online] [Retrieved on Feb. 4, 2012]. Retrieved from the Internet: <URL: http://en.wikipedia.org/wiki/Domain_Name_System>, 16 pages.
Bucket Explorer. "What is my AWS Access and Secret Key." [Retrieved Apr. 26, 2011]. Retrieved from the Internet <URL: http://www.bucketexplorer.com/documentation/amazon-s3--what-is-my-aws-access-and-secret-key.html>, 1 page.
Hongkiat. "Amazon S3—The Beginner's Guide." [Retrieved on Apr. 26, 2011]. Retrieved from the Internet <URL: http://www.hongkiat.com/blog/amazon-s3-the-beginners-guide/>, 9 pages.
Myerson, Judith. "Creating Applications with Amazon EC2 and S3." O'ReillyOnLamp.com, May 13, 2008 [Retrieved on Apr. 26, 2011]. Retrieved from the Internet <URL: http://onlamp.com/pub/a/onlamp/2008/05/13/creating-applications-with-amazon-ec2-and-s3.html>, 8 pages.
Wikipedia. "OAuth." [online] [Retrieved on Jan. 20, 2011]. Retrieved from the Internet <URL: http://en.wikipedia.org/wiki/OAuth>, 3 pages.
Gowalla. "API Documentation—Oauth." [Retrieved on Apr. 26, 2011]. Retrieved from the Internet <URL: http://gowalla.com/api/docs/oauth>, 4 pages.
Apache HTTP Server Version 2.0. "Log Files." [Retrieved on Feb. 15, 2011]. Retrieved from the Internet <URL: http://httpd.apache.org/docs/2.0/logs.html>, 7 pages.
Microsoft Support. "How to view and manage event logs in Event Viewer in Windows XP." May 7, 2007, version 3.5 [Retrieved on Feb. 15, 2011]. Retrieved from the Internet <URL: http://support.microsoft.com/kb/308427>, 6 pages.
MSDN. "Visual Basic Concepts, Visual Studio 6.0: Centralized Error Handling." [Retrieved on Feb. 15, 2011]. Retrieved from the Internet <URL: http://msdn.microsoft.com/en-us/library/aa240795(d=printer, v=vs.60).aspx>, 4 pages.
Laitinen, Aapo et al., Network Address Translation [Retrieved on Oct. 10, 2011] Retrieved from the Internet: <URL: http://en.wikipedia.org/wiki/Networkpages_Address_and_Port_Translation>, 11 pages.
Wikipedia., Anycast [Retrieved on Oct. 10, 2011] Retrieved from the Internet: URL<http://en.wikipedia.org/wiki/Anycast>, 5 pages.
VMCI Overview [Retrieved on Jun. 8, 2011] Retrieved from the Internet: <URL: http://pubs.vmware.com/vmci-sdk/VMCI_intro.html>, 3 pages.
VMware vSphere [Retrieved on Jun. 8, 2011] Retrieved from the Internet: <URL: http://www.vmware.com/products/vmotion/overview.html>, 2 pages.
Travostino, Franco, et al., Seamless Live Migration of Virtual Machines over the MAN/WAN, 2006, Elsevier Future Generation Computer Systems 2006, 10 pages.
VMCI Datagram API [Retrieved on Jun. 8, 2011], Retrieved from the Internet: <URL: http://pubs.vmware.com/vmci-sdk/datagram.html>, 1 page.
VMCI Datagram_SendTo [Retrieved on Jun. 8, 2011], Retrieved from the Internet: <URL: http://pubs.vmware.com/vmci-sdk/functions/VMCIDatagram_SendTo.html>, 1 page.
VMCIDs_Lookup [Retrieved on Jun. 8, 2011], Retrieved from the Internet: <URL: http://pubs.vmware.com/vmci-sdk/functions/VMCIDs_Lookup.html>, 2 pages.
Chen, Per M., et al., : "Maximizing Performance in a Striped Disk Array", 17th Annual International Symposium on Computer Architecture (SIGARCH 1990), 18 pages.
Sarhan, Nabil J., et al., "Caching and Scheduling in NAD-Based Multimedia Servers"; IEEE Computer Society, IEEE Transactions on Parallel and Distributed Systems, vol. 15, No. 10, Oct. 2004; pp. 921-933.
Vazhkudai, Sudharshan S., et al.; "Constructing Collaborative Desktop Storage Caches for Large Scientific Datasets"; ACM Journal Name, vol. V, No. N, Jun. 2006, 34 pages.
OMG, Deployment and Configuration of Component-based Distributed Applications Specification—Version 4.0, OMG, 2006, pp. 1-160.
Cala et al., "Automatic Software Deployment in the Azure Cloud", IFIP International Federation for Information Processing, 2010, pp. 1-14.
RSA Laboratories, "PKCS #11 v2.20: Cryptographic Token Interface Standard," Jun. 28, 2004, RSA Security Inc. (407 pages).
Amazon Auto Scaling—Getting Started Guide—API Version Aug. 1, 2010. Amazon Web Services LLC, 2010, 20 pages.
Amazon Auto Scaling—Developer Guide—API Version Aug. 1, 2010. Amazon Web Services LLC, 2011, 62 pages.
Amazon CloudWatch—Developer Guide—API Version Aug. 1, 2010. Amazon Web Services LLC, 2010, 75 pages.
Benincosa. "Ganglia and Nagios, Part 2: Monitor enterprise clusters with Nagios-Install Nagios to effectively monitor a data center; make Ganglia and Nagios work together," 2009, 20 pages.
'Nagios' [online]. "Monitoring Linux/Unix Machines," 2011, [retrieved on Feb. 3, 2011]. Retrieved from the Internet: URL: <http://nagios.sourceforge.net/docs/3_0/monitoring-linux.html > 1 page.
'Nagios' [online]. "Nagios Plugins," 2011, [retrieved on Feb. 3, 2011]. Retrieved from the Internet: URL: <http://nagios.sourceforge.net/docs/3_0/plugins.html > 2 pages.
'Zabbix' [online]. "Zabbix 1.8: The Ultimate Open Source Monitoring Solution," 2001-2012, [retrieved on Feb. 3, 2011]. Retrieved from the Internet: URL: <http://www.zabbix.com/features.php.> 1 page.
Amazon Elastic Compute Cloud, User Guide, API Version Mar. 1, 2012, pp. 97-103, downloaded from http://docs.amazonwebservices.com/AWSEC2/latest/UserGuide/AESDG-chapter-instancedata.html?r=4276 on Mar. 18, 2012.
Paravirtualization, Wikipedia Article, downloaded from http://en.wikipedia.org/wiki/Paravirtualization on Mar. 18, 2012.
Paravirtualized File Systems, Eric Van Hensbergen, downloaded from http://www.slideshare.net/ericvh/9p-on-kvm on Mar. 18, 2012.
"IPsec". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-8.
"Generic Routing Encapsulation". Creativecommons.org [online]. Creative Commons Attribution-Share Alike 3.0 Unported. [retrieved on Jan. 14, 2011]. Retrieved from the Internet:<URL: http://creativecommons.org/licenses/by-sa/3.0/ >, pp. 1-5.
Cloud Computing Course, Part 2: Amazon's EC2, Marcel Gagne, Jun. 13, 2011. Retrieved from the Internet: <URL: http://marcelgagne.com/content/cloud-computing-course-part-2-amazons-ec2>, 6 pages.
Uploading Personal ssh Keys to Amazon EC2, Eric Hammond, Oct. 14, 2010. Retrieved from the Internet: <URL:http://alestic.com/2010/10/ec2-ssh-keys>, 3 pages.
Key Management In Cloud Datacenters, Security Stackexchange.com, Retrieved from the Internet on Nov. 18, 2011; Retrieved from: <URL: http://security.stackexchange.com/questions/2514/key-management-in-cloud-datacenters>, 2 pages.
Managing Amazon EC2—SSH Login and Protecting Your Instances, Everyday's Findings, Monday, May 18, 2009, Retrieved from the (56) References Cited

OTHER PUBLICATIONS

Internet on Nov. 18, 2011; Retrieved from: <URL: http://blog.tag-gesell.de/index.php?/aarchives/73-Managing-Amazon-EC2., 6 pages.

Using and Managing AWS—Part 6: SSH Key Pairs, Top WordPress, May 26, 2009, Retrieved from the Internet: <URL: http://clouddb.info/2009/05/26/using-and-managing-aws-part-6-ssh-key-pairs>, 5 pages.

Seamless Live Migration of Virtual Machines Over the MAN/WAN, Franco Travostino et al., 2006, Elsevier Future Generation Computer Systems, 10 pages.

L. Gommans, et al., Token-Based Authorization of Connection Oriented Network Resources, 1st International Workshop on Networks for Grid Applications (GridNets 2004), Oct. 29, 2004; 8 pages.

Bok, Jin Yo, Authorized Officer for Korean Intellectual Property Office, International Search Report and Written Opinion for PCT/US2012/029210, International Search Report completed Oct. 10, 2012, 2 pages.

Anonymous, Storage I/O Control Technical Overview and Consideration for Deployment VMware vSphere™ 4.1, Jan. 1, 2010, XP05504491, retrieved from the internet: URL: http://www.vmware.com/fled/pdf/techpaper/WMW-vSphere41-SIOC.pdf; [retrieved on Nov. 21, 2012], the entire document.

Cabellos et al., LISPmob: Mobile Networking through LISP, Apr. 2, 2012, 8 pages.

Steinmetz, Christof, Authorized Office for European Patent Office, International Search Report and Written Opinion for PCT/US2013/034140, completed Jun. 25, 2013, 21 pages.

Hehn, Eva, Authorized Office for European Patent Office, International Search Report and Written Opinion for PCT/US2013/027456, completed Jun. 24, 2013,11 pages.

Eng, Lili, Australian Government, IP Australia, Examiner's First Report for 2012200562, dated Jun. 4, 2012, 2 pages.

\* cited by examiner

MANAGED BOOT IN A CLOUD SYSTEM

PRIORITY CLAIM

This patent document claims the benefit of the priority of U.S. Provisional Application Ser. No. 61/432,553, filed Jan. 13, 2011 and entitled "MANAGED BOOT IN A CLOUD SYSTEM," which is incorporated herein by reference in its entirety.

TECHNICAL FIELD

This patent document relates to virtual machines.

BACKGROUND

Cloud computing is network-based computing in which typically large collections of servers housed in data centers or "server farms" provide computational resources and data storage as needed to remote end users. Some cloud computing services allow end users to run user-provided server software applications (e.g., e-commerce server application, web server, or file server) in the cloud. Some other cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on the server farm may simplify management of end user computing devices. Some cloud computing services allow end users to execute software applications in virtual machines.

SUMMARY

This document describes technologies relating to virtual machine boot management in a cloud system. An aspect of the described technologies can be implemented in a method that includes creating, at a server system, a boot image based on one or more user-specified parameters associated with virtual machine booting, providing a first virtual drive that includes the boot image, booting a virtual machine using the boot image on the first virtual drive, and providing a second virtual drive to the virtual machine, where the virtual machine mounts the second virtual drive as a root file system. Other implementations can include corresponding systems, apparatus, and computer programs, configured to perform the actions of the methods, encoded on computer storage mediums.

These and other implementations can include one or more of the following features. One or more parameters can include an identifier of an operating system kernel. Creating the boot image can include an operating system kernel in the boot image. One or more parameters can include an identifier of a kernel module. Creating a boot image can include including a kernel module in the boot image. In some implementations, one or more parameters include a size parameter of a random access memory (RAM) disk. Booting a virtual machine can include initializing a RAM disk in accordance with the size parameter. In some implementations, the one or more parameters include an image for a RAM disk. Booting the virtual machine can include initializing the RAM disk with the image. In some implementations, a virtual machine is configured to allow kernel modules to be loaded after the booting is complete. In some implementations, a virtual machine is configured to restrict user-provided kernel modules from being loaded after the booting is complete. Implementations can include receiving one or more user-specified parameters via a network. Creating a boot image can be in response to receiving one or more user-specified parameters. Implementations can include providing, via the network, a web-based user interface. One or more user-specified parameters can be specified via the web-based user interface. In some implementations, the virtual machine is configured to restrict all kernel modules from being loaded after the booting is complete. Implementations can include providing, via the network, an application programming interface. The one or more user-specified parameters can be specified via the application programming interface.

Particular embodiments of the subject matter described in this document can be implemented so as to realize one or more of the following advantages. A managed virtual machine boot environment can minimize or eliminate an attack surface associated with running applications. The environment can provide an interface for customizing one or more boot parameters of a virtual machine. The environment can provide an efficient mechanism for creating and launching virtual machines based on respective user customized boot configurations. The environment can provide a mechanism to specify and package up a boot image that is separate from a root file system.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Cloud computing services provide execution environments, such as virtual machines, for running software applications. A user can customize an execution environment to meet user specific requirements via a cloud interface provided by a cloud computing service. The user can use the cloud interface to specify parameters, such as a type of operating system, for running a software application. In some implementations, a cloud interface can accept user-provided software applications for execution on cloud computing resources. For example, a cloud computing service can create a virtual machine with a user-specified operation system image. The cloud computing service can launch the virtual machine to run a user-provided software application.

Figure 1:
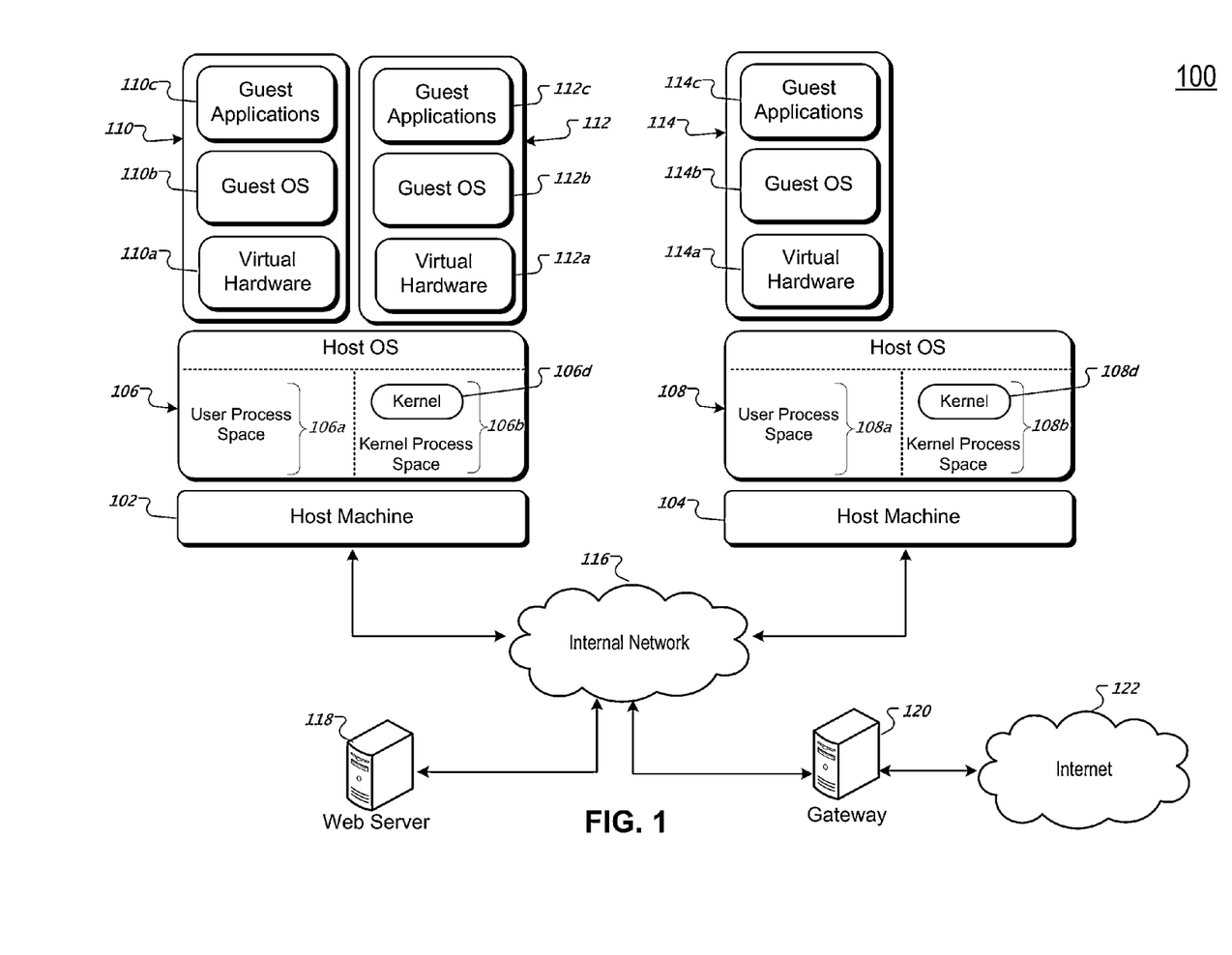
FIG. 1 shows an example of a cloud based server system that runs multiple virtual machine instances.

FIG. 1 shows an example of a cloud based server system that runs multiple virtual machine instances. A cloud based server system 100 can run virtual machines 110, 112, 114, on one or more host machines 102, 104. Elements of the server system 100 can reside in one or more physical locations. The server system 100 can include a web server 118 that provides, via the Internet 122, a web-based interface for customizing an execution environment. The web-based interface can include an interface for customizing one or more boot parameters associated with a virtual machine. For example, the web server 118 can receive information, e.g., virtual machine boot parameters, for creating a virtual machine boot disk, which can be referred to as a virtual boot disk. The server system 100 can launch a virtual machine based on the created virtual boot disk. In some implementations, the web server 118 is configured to receive user-provided kernel images, kernel modules, or both. In some implementations, the web server 118 allows an end user to select a kernel image from a list of kernel images that are approved for use by a cloud computing service operating the server system 100.

The host machines 102, 104 included in the server system 100 can contain one or more data processing apparatuses such as rack mounted servers or other computing devices. Host machines 102, 104 can have different capabilities and computer architectures. Host machines 102, 104 can communicate with each other through an internal data communications network 116. The internal network 116 can include one or more wired (e.g., Ethernet) or wireless (e.g., WI-FI) networks, for example. In some implementations the internal network 116 is an intranet. Host machines 102, 104 can also communicate with devices on external networks, such as the Internet 122, through one or more gateways 120 which are data processing apparatus responsible for routing data communication traffic between the internal network 116 and the Internet 122. Other types of external networks are possible.

Each host machine 102, 104 executes a host operating system 106, 108. A host operating system 106, 108 manages host machine resources. In this example, host operating systems 106, 108 run software that virtualizes the underlying host machine hardware and manages concurrent execution of one or more virtual machines (VMs). For example, the host operating system 106 manages two VMs (VM 110 and VM 112), while a different host operating system 108 manages a single VM 114. A host machine can, in general, manage larger quantities of virtual machines; however, the quantity may be limited based on physical resources of the host machine.

In some implementations, a host operating system 106, 108 can boot a virtual machine using a virtual boot disk. A virtual boot disk can be a digital file such as a bootable disk image. The virtual boot disk can be provided by a web server 118. In some implementations, the web server 118 can control a host machine 102, 104 to boot a virtual machine based on user-specified boot parameters.

The VMs 110, 112, 114 provides a simulated version of an underlying host machine hardware and referred to as virtual hardware (e.g., virtual hardware 110a, 112a and 114a). Software that is executed by the virtual hardware can be referred to as guest software. In some implementations, guest software cannot determine if it is being executed by virtual hardware or by a physical host machine. If guest software executing in a VM, or the VM itself, malfunctions or aborts, other VMs executing on the host machine will not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM (e.g., VMs 110, 112 and 114) is allocated a set of virtual memory pages from the virtual memory of the underlying host operating system and is allocated virtual disk blocks from one or more virtual disk drives for use by the guest software executing on the VM. For example, host operating 106 allocates memory pages and disk blocks to VM 110 and VM 112, and host operating system 108 does the same for VM 114. In some implementations, a given VM cannot access the virtual memory pages assigned to other VMs. For example, VM 110 cannot access memory pages that have been assigned to VM 112. A virtual disk drive can be persisted across VM restarts. Virtual disk blocks are allocated on physical disk drives coupled to host machines or available over the internal network 116, for example. In addition to virtual memory and disk resources, VMs can be allocated network addresses through which their respective guest software can communicate with other processes reachable through the internal network 116 or the Internet 122. For example, guest software executing on VM 110 can communicate with guest software executing on VM 112 or VM 114. In some implementations, each VM is allocated one or more unique Internet Protocol (IP) version 4 or version 6 addresses and one or more User Datagram Protocol (UDP) port numbers. Other address schemes are possible. The VM IP addresses are visible on the internal network 116 and, in some implementations, are visible on the Internet 122 if the addresses are advertised using a suitable routing protocol, for instance.

A VM's guest software can include a guest operating system (e.g., guest operating systems 110b, 112b and 114b) which is software that controls the execution of respective guest software applications (e.g., guest applications 110c, 112c and 114c), within the VM and provides services to those applications. For example, a guest operating system can be an operating system such as a variant of the UNIX operating system. Other operating systems are possible. Each VM can execute the same guest operating system or different guest operating systems. Booting a VM can include using a virtual boot disk to load a kernel image associated with a guest operating system into memory. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges (sometimes referred to as "supervisor mode"); that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

Figure 2:
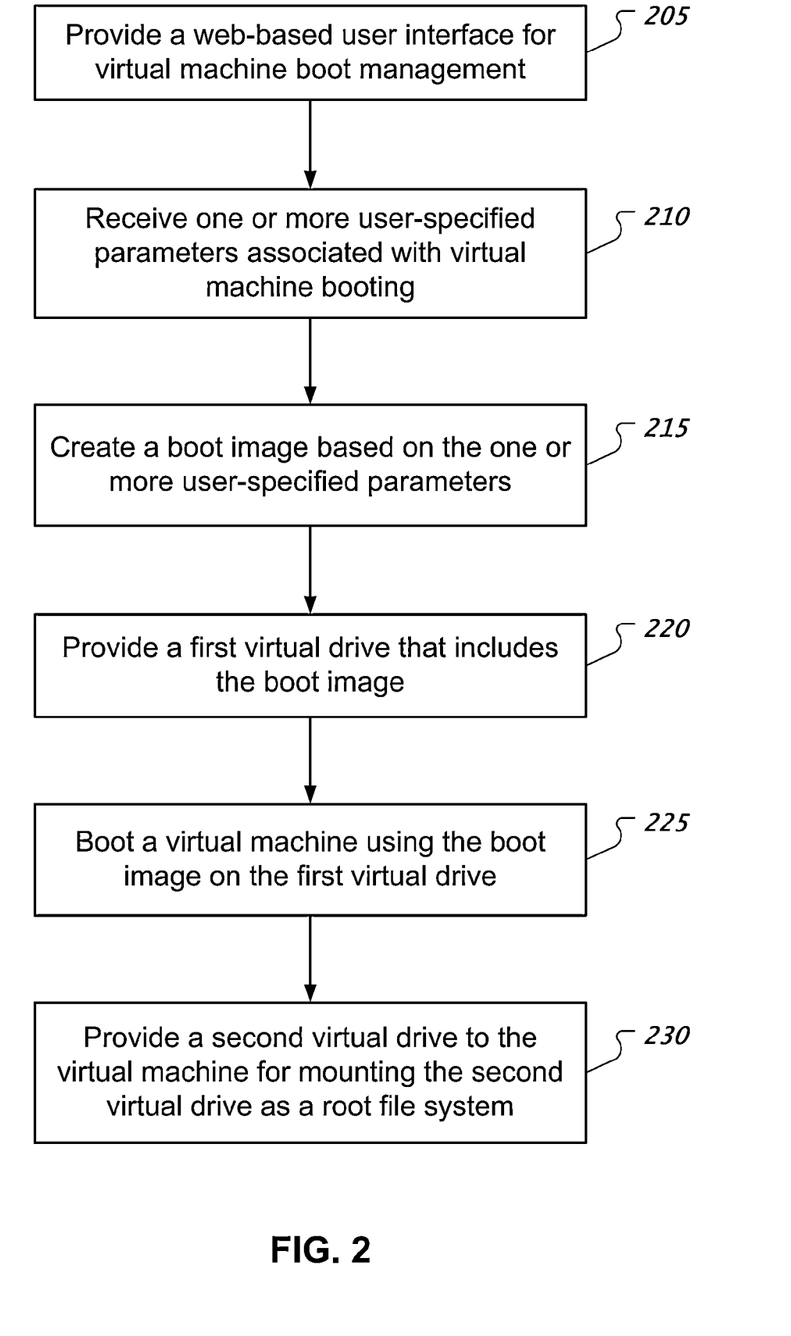
FIG. 2 shows an example of a server system process for managed boot in a cloud based server system

FIG. 2 shows an example of a server system process for managed boot in a cloud based server system. At 205, a server system provides a web-based user interface for virtual machine boot management. For example, a web server (e.g., web server 118 of FIG. 1) within the server system can provide an interface for virtual machine boot customization. The interface can solicit input for one or more parameters associated with virtual machine booting. In some implementations, the server system provides an application programming interface that can be used to specify one or more parameters. Various examples of such parameters include an identifier of an operating system kernel, an identifier of a kernel module, and a size parameter of a random access memory (RAM) disk. In some implementations, a kernel module can include a driver such as a driver for a resource (e.g., storage device). Other types of parameters are possible.

The server system, at 210, receives one or more user-specified parameters associated with virtual machine booting. In some implementations, receiving parameters can include receiving parameter values, receiving parameter indices values that correspond to parameter values, or a combination thereof. For example, a parameter can indicate a use of a specific kernel image, such as XYZ kernel image 2.9, where XYZ represents a name of an operating system. A received parameter value can be a text string with "XYZ_2.9," whereas a received parameter index value, such as 5, can correspond to "XYZ_2.9." Other techniques for conveying user-specified parameters are possible.

At 215, the server system creates a boot image based on the one or more user-specified parameters. A boot image, in general, is used for booting a machine and includes operating system software. A boot image can include a boot loader, a configuration file, a kernel image, and one or more kernel modules. The kernel image includes one or more operating system elements such as a task scheduler and a memory allocator. Creating a boot image can include writing a kernel image to a boot image, the identity of the kernel image being specified by one of the parameters. Creating a boot image can include writing one or more kernel modules to a boot image. The layout of a boot image can be based on a layout of a bootable medium, e.g., a physical disk that is bootable by a computer.

At 220, the server system provides a first virtual drive that includes the boot image. A virtual drive that includes a boot image can be referred to as a virtual boot disk. A virtual boot disk can include a boot loader, a configuration file, a kernel image, and one or more kernel modules. Providing a first virtual drive can include simulating a physical drive (e.g., a hard disk drive (HDD), a solid state device (SSD), or an optical disk drive) using an underlying data store, e.g., one or more files residing on a file system accessible by the server system. A provided virtual drive, for example, can appear as a physical device to the virtual machine via an interface such as a Small Computer System Interface (SCSI) or AT Attachment Packet Interface (ATAPI). Other types of interfaces are possible.

At 225, the server system boots a virtual machine using the boot image on the first virtual drive. In some implementations, a process running on a server system can control a virtual machine process to boot from the first virtual drive. In some implementations, a server system boots a virtual machine by loading a boot loader included in the boot image into a memory of the virtual machine. For example, a virtual machine, having a virtual basic input/output system (BIOS) in a virtual machine can be programmed to access a drive (e.g., the first virtual drive) and load, from the drive, a boot loader into a memory of the virtual machine. The boot loader can load a kernel image from the first virtual drive into a memory of the virtual machine. In some implementations, the one or more parameters include an image for a RAM disk. Booting the virtual machine can include accessing a RAM disk image, creating the RAM disk in a computer memory, and initializing the RAM disk with the image. In some implementations, RAM disk image is a binary that gets expanded after being initialized as a RAM disk, which then provides the initial file system before the root file system can be mounted. In some implementations, a boot loader initializes a RAM disk in accordance with a RAM disk size parameter. In some cases, a boot loader can load one or more files (e.g., a kernel module or a configuration file) into a storage area such as a RAM disk. The kernel image can include instructions to search for and load one or more kernel modules residing on the RAM disk.

At 230, the server system provides a second virtual drive to the virtual machine for mounting the second virtual drive as a root file system. After the virtual machine starts running an operation system, the operating system can mount one or more drives. Mounting a drive can include mounting one or more partitions of the drive. A drive can include a partition with a file system that, once mounted, provides a root file system to the operating system. The root file system can include one or more operating system components, which are in addition to those provided by a kernel image. The root file system can include application executable files and application data files. The virtual machine's operating system can send requests such as read or write request to a virtual drive of the virtual machine. The server system can transform requests to a virtual drive into requests that read or write a file stored in a physical drive of the server system.

A server system can use one or more security mechanisms to protect itself from malicious behavior originating from a virtual machine. For example, a server system can implement a mechanism that restricts a virtual machine's ability to communicate with networked hosts and to access underlying physical resources. Moreover, a server system can configure a virtual machine based on one or more security related policies. For example, a virtual machine can be configured to allow kernel modules to be loaded after the booting is complete. In another example, a virtual machine can be configured to restrict user-provided kernel modules from being loaded after the booting is complete. In some implementations, the kernel image loaded by a virtual machine provides one or more security mechanisms that protect a server system from malicious code executing on a virtual machine. For example, a security mechanism can prevent kernel modules from being loaded or modified. In another example, a security mechanism can implement a firewall that restricts one or more types of incoming or outgoing network activity. In some implementations, the virtual machine is configured to restrict all kernel modules from being loaded after the booting is complete.

Figure 3:
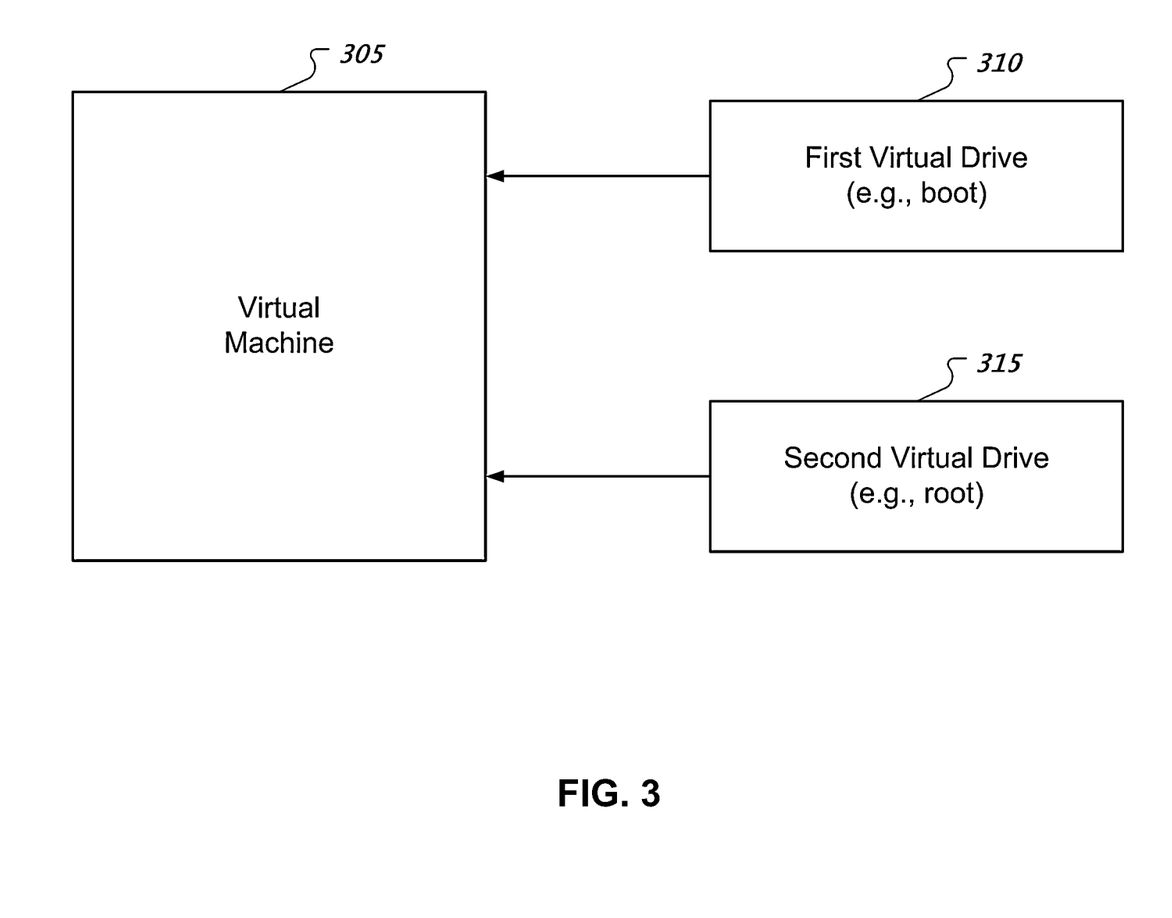
FIG. 3 shows an example of a virtual drive configuration of a virtual machine.

FIG. 3 shows an example of a virtual drive configuration of a virtual machine. A server system can provide two or more virtual drives to a virtual machine 305. The server system can provide a first virtual drive 310, such as a boot drive, to the virtual machine 305. The server system can provide a second virtual drive 315, such as a root file system, to the virtual machine 305. In this example, the virtual machine 305 boots from the first virtual drive 310. The virtual machine 305 mounts the second virtual drive 315 as the root file system.

Figure 4:
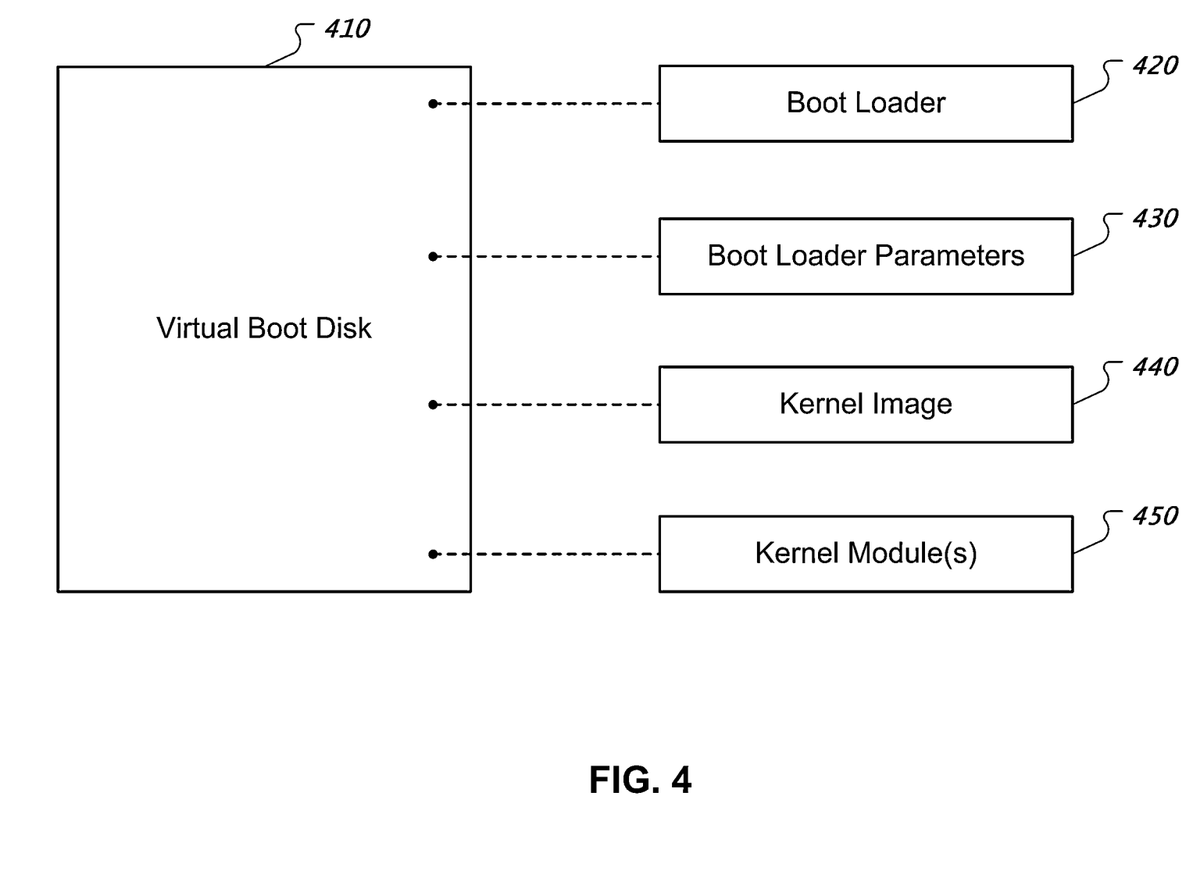
FIG. 4 shows an example of a layout of a virtual boot disk.

FIG. 4 shows an example of a layout of a virtual boot disk. The first virtual drive 310 of FIG. 3 can include the contents of a virtual boot disk 410. A virtual boot disk 410 can include a boot loader 420, boot loader parameters 430, a kernel image 440, and one or more kernel modules 450. The layout of the virtual boot disk 410 can be based on a layout of a bootable medium, e.g., a physical disk that is bootable by a computer. For example, the layout can indicate a location for a boot record, e.g., the first sector of the medium. Other layouts are possible. In some implementations, the first sector of the medium can correspond to the first 512 bytes of the boot image file. The boot image can include a boot record such as a master boot record (MBR) or a volume boot record (VBR). A MBR can include a boot loader 420.

Figure 5:
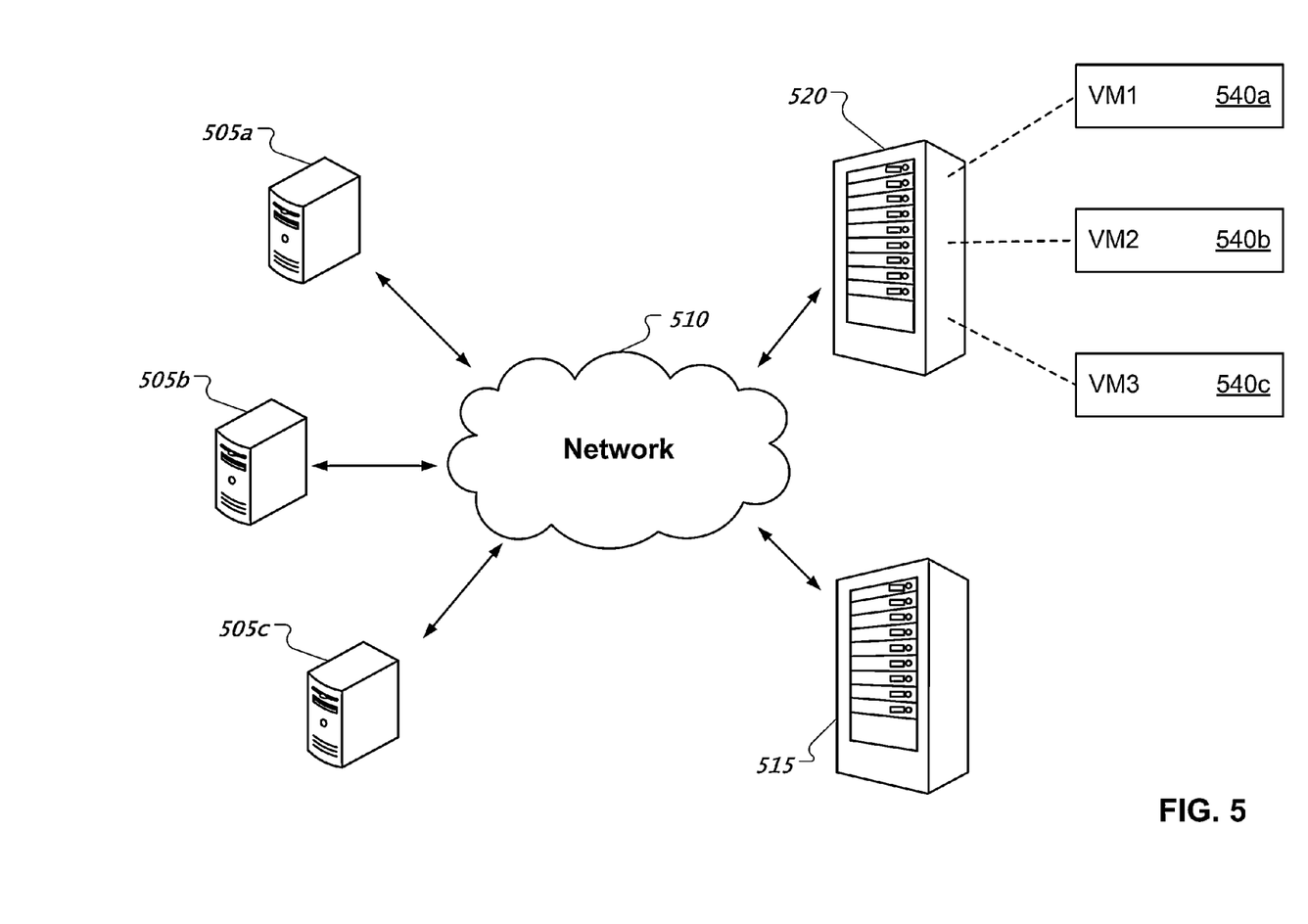
FIG. 5 shows an example of communication flows among server systems and multiple client systems.

FIG. 5 shows an example of communication flows among server systems and multiple client systems. Client systems 505*a*, 505*b*, 505*c* can access one or more cloud based computing resources, such as a virtual machine farm, via a web server system 515 over a network 510. The web server system 515 provides web-based cloud management tools such as VM configuration tools for controlling one or more virtual machine resources on a VM server system 520. The VM server system 520 provides hardware resources, such as memory and processors, for running virtual machines 540*a*, 540*b*, 540*c*. The web server system 515 can control the VM server system 520 to start the virtual machines 540*a*, 540*b*, 540*c*. The VM server system 520 can create virtual boot disks for the virtual machines 540*a*, 540*b*, 540*c* using user input received from respective client systems 505*a*, 505*b*, 505*c* via the web server system 515.

Figure 6:
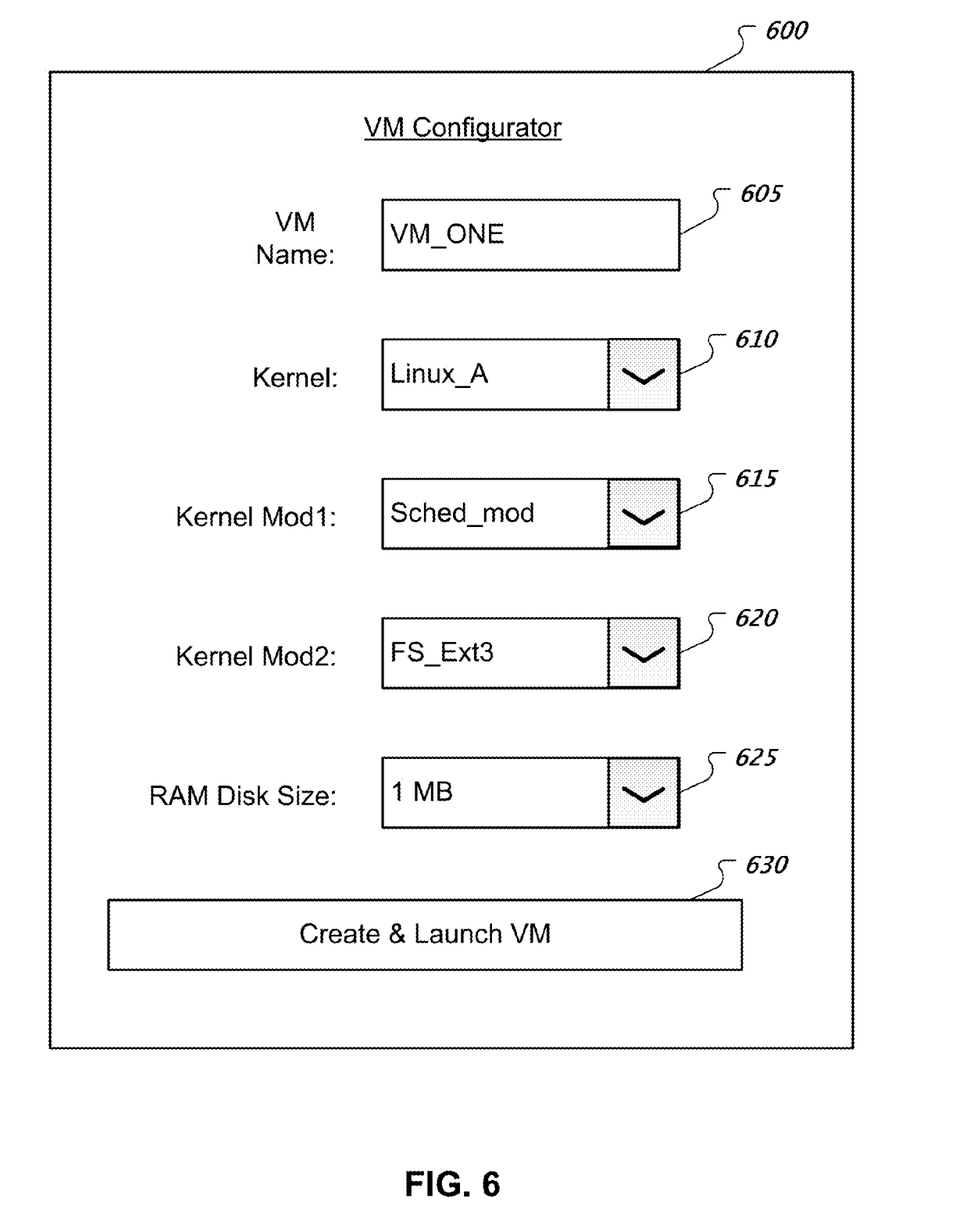
FIG. 6 shows an example of a web-based interface of a virtual machine configurator.

FIG. 6 shows an example of a web-based interface of a virtual machine configurator. A web server can provide web data to a client, that when rendered by the client displays an interface that includes a VM configurator 600. The VM configurator 600 provides input boxes 605, 610, 615, 620, 625, 630 for gathering information associated with the creation of a virtual machine boot image. Various examples of input boxes include a box 605 for entering a virtual machine name, a box 610 for selecting a kernel (e.g., the box 610, when clicked can provide a drop down menu that contains one or more kernel identifiers, such as Linux_A), boxes 615, 620 for selecting kernel modules 615, 620, and a box 625 for selecting a RAM disk size. The VM configurator 600 provides a button 630, that when clicked, submits the parameters whose values are indicted by their respective boxes to the web server. The web server can supply the submitted parameters to a cloud server that creates a VM boot image based on the submitted parameters. After creating the VM boot image, the cloud server can boot a virtual machine based on the created VM boot image. A web server can collected additional data (e.g., such as files to be included in a root file system) from a client.

A system can include a network interface to receive data, the data including one or more user-specified parameters associated with virtual machine booting; and processor electronics configured to create, at a server system, a boot image based on one or more user-specified parameters associated with virtual machine booting, provide a first virtual drive that includes the boot image, boot a virtual machine using the boot image on the first virtual drive, and provide a second virtual drive to the virtual machine. The virtual machine can mount the second virtual drive as a root file system. In some implementations, processor electronics includes one or more processors.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    creating, at a server system, a boot image based on one or more user-specified parameters associated with virtual machine booting;
    providing a first virtual drive that includes the boot image;
    booting a virtual machine using the boot image on the first virtual drive; and
    providing a second virtual drive to the virtual machine, wherein the virtual machine mounts the second virtual drive as a root file system.

2. The method of claim 1, wherein the one or more parameters include an identifier of an operating system kernel, wherein creating the boot image comprises including the operating system kernel in the boot image.

3. The method of claim 2, wherein the one or more parameters include an identifier of a kernel module, wherein creating the boot image comprises including the kernel module in the boot image.

4. The method of claim 1, wherein the one or more parameters include a random access memory (RAM) disk image, wherein booting the virtual machine comprises creating a RAM disk in a computer memory, and initializing the RAM disk in the computer memory with the RAM disk image.

5. The method of claim 1, wherein the virtual machine is configured to allow kernel modules to be loaded after the booting is complete.

6. The method of claim 1, wherein the virtual machine is configured to restrict all kernel modules from being loaded after the booting is complete.

7. The method of claim 1, further comprising:
    receiving the one or more user-specified parameters via a network, wherein creating the boot image is in response to receiving the one or more user-specified parameters.

8. The method of claim 1, further comprising:
providing an application programming interface; and
receiving the one or more user-specified parameters via the application programming interface.

9. A computer storage medium encoded with a computer program, the program comprising instructions that when executed by data processing apparatus cause the data processing apparatus to perform operations comprising:
creating, at a server system, a boot image based on one or more user-specified parameters associated with virtual machine booting;
providing a first virtual drive that includes the boot image;
booting a virtual machine using the boot image on the first virtual drive; and
providing a second virtual drive to the virtual machine, wherein the virtual machine mounts the second virtual drive as a root file system.

10. The storage medium of claim 9, wherein the one or more parameters include an identifier of an operating system kernel, wherein creating the boot image comprises including the operating system kernel in the boot image.

11. The storage medium of claim 10, wherein the one or more parameters include an identifier of a kernel module, wherein creating the boot image comprises including the kernel module in the boot image.

12. The storage medium of claim 9, wherein the one or more parameters include a random access memory (RAM) disk image, wherein booting the virtual machine comprises creating a RAM disk in a computer memory, and initializing the RAM disk with the RAM disk image.

13. The storage medium of claim 9, wherein the virtual machine is configured to allow kernel modules to be loaded after the booting is complete.

14. The storage medium of claim 9, wherein the virtual machine is configured to restrict all kernel modules from being loaded after the booting is complete.

15. The storage medium of claim 9, the operations comprising:
receiving the one or more user-specified parameters via a network, wherein creating the boot image is in response to receiving the one or more user-specified parameters.

16. The storage medium of claim 9, the operations comprising:
providing an application programming interface; and
receiving the one or more user-specified parameters via the application programming interface.

17. A system comprising:
one or more server computers and one or more storage devices storing instructions that are operable, when executed by the one or more server computers, to cause the one or more server computers to perform operations comprising:
receiving data via an interface, the data including one or more user-specified parameters associated with virtual machine booting;
creating a boot image based on one or more user-specified parameters associated with virtual machine booting;
providing a first virtual drive that includes the boot image,
booting a virtual machine using the boot image on the first virtual drive; and
providing a second virtual drive to the virtual machine, wherein the virtual machine mounts the second virtual drive as a root file system.

18. The system of claim 17, wherein the one or more parameters include an identifier of an operating system kernel, wherein creating the boot image comprises including the operating system kernel in the boot image.

19. The system of claim 18, wherein the one or more parameters include an identifier of a kernel module, wherein creating the boot image comprises including the kernel module in the boot image.

20. The system of claim 17, wherein the one or more parameters include a random access memory (RAM) disk image, wherein booting the virtual machine comprises creating a RAM disk in a computer memory, and initializing the RAM disk with the RAM disk image.

21. The system of claim 17, wherein the virtual machine is configured to allow kernel modules to be loaded after the booting is complete.

22. The system of claim 17, wherein the virtual machine is configured to restrict all kernel modules from being loaded after the booting is complete.

23. The system of claim 17, wherein the interface is an application programming interface.

24. The method of claim 2, wherein the root file system includes one or more operating system components.

25. The storage medium of claim 10, wherein the root file system includes one or more operating system components.

26. The system of claim 18, wherein the root file system includes one or more operating system components.

* * * * *